Nov. 3, 1931.  F. M. CARROLL  1,830,050
COMPUTING SCALE
Filed Oct. 31, 1927  7 Sheets-Sheet 1

Inventor
FRED M. CARROLL
By his Attorney

Nov. 3, 1931.  F. M. CARROLL  1,830,050
COMPUTING SCALE
Filed Oct. 31, 1927　　7 Sheets-Sheet 6

Inventor
FRED M. CARROLL
By his Attorney

Patented Nov. 3, 1931

1,830,050

UNITED STATES PATENT OFFICE

FRED M. CARROLL, OF YONKERS, NEW YORK, ASSIGNOR TO DAYTON SCALE COMPANY, OF DAYTON, OHIO, A CORPORATION OF NEW JERSEY

COMPUTING SCALE

Application filed October 31, 1927. Serial No. 229,895.

This invention relates to weighing scales, particularly of the computing type. In the computing scale art, it is the practice to provide the chart with a plurality of scales, each graduated in accordance with a different price per unit weight or rate. These cost graduations on each scale are the product of the rate and a corresponding weight. When an article is placed on the platform of the scale, a number is disclosed opposite the indicating line which is the total cost of the article based on a selected rate. In order for the chart to accommodate a great number of rate scales, it is necessary to make the designations on each scale very small. Furthermore, it is usually the practice to inscribe alongside the cost designations on each scale of the chart, the corresponding weight designations. This necessitates making the designations even smaller making them very difficult to read. Certain computing scales have been provided with a chart having duplicate sets of rate scales, one set to be read by the customer and the other by the clerk. This has required making the designations even more minute than before thus further increasing the difficulty of reading. Other computing scales which are adapted to show the reading to the customer as well as the clerk are provided for this purpose with two duplicate charts. In both types of computing scales, the effect is to decrease the capacity of a given size of scale in order to permit the customer to see the reading. While certain magnifying and illuminating devices have been utilized to make the reading of the charts less difficult, they have not proved satisfactory unless the customer is close to the scale and directly above the readings.

According to the present invention, a scale has been devised wherein an optical system is designed to project at opposite sides of the scale, the magnified images of graduations of a single chart having no duplicate rate scales. This results in increasing the capacity of the scale and at the same time overcoming the difficulty of reading the indications. This invention further contemplates the provision of a plurality of adjustable charts thus further increasing the capacity of the scale.

The object of this invention is to increase the capacity of a weighing scale.

Another object is the provision of an optical system for showing at opposite sides of a scale, images of graduations on a stationary chart.

Another object is also the provision of an optical system for displaying at opposite sides of a scale, the images of graduations of a chart having no duplicate rate scales.

Another object is to project upon oppositely facing screens, the magnified image of one of a series of chart indications.

Another object is to increase the range of the scale by providing interchangeable charts each of which may be automatically positioned for cooperation with the reading mechanism.

Another object is to improve the means for selecting a particular rate on a chart.

Other objects are severally, to locate the image of a chart graduation in the same position on a screen regardless of the position of the reading mechanism or the particular rate being read, to indicate on a screen the price per unit weight or the rate at which the cost designation displayed upon the screen has been computed, and to provide an optical reading system movable in response to the load.

Other objects and advantages will be apparent from the following description, in which reference is had to the accompanying drawings illustrating preferred embodiments of my invention and wherein similar reference numerals desigate similar parts throughout the drawings wherein.

Figures 1, 11:
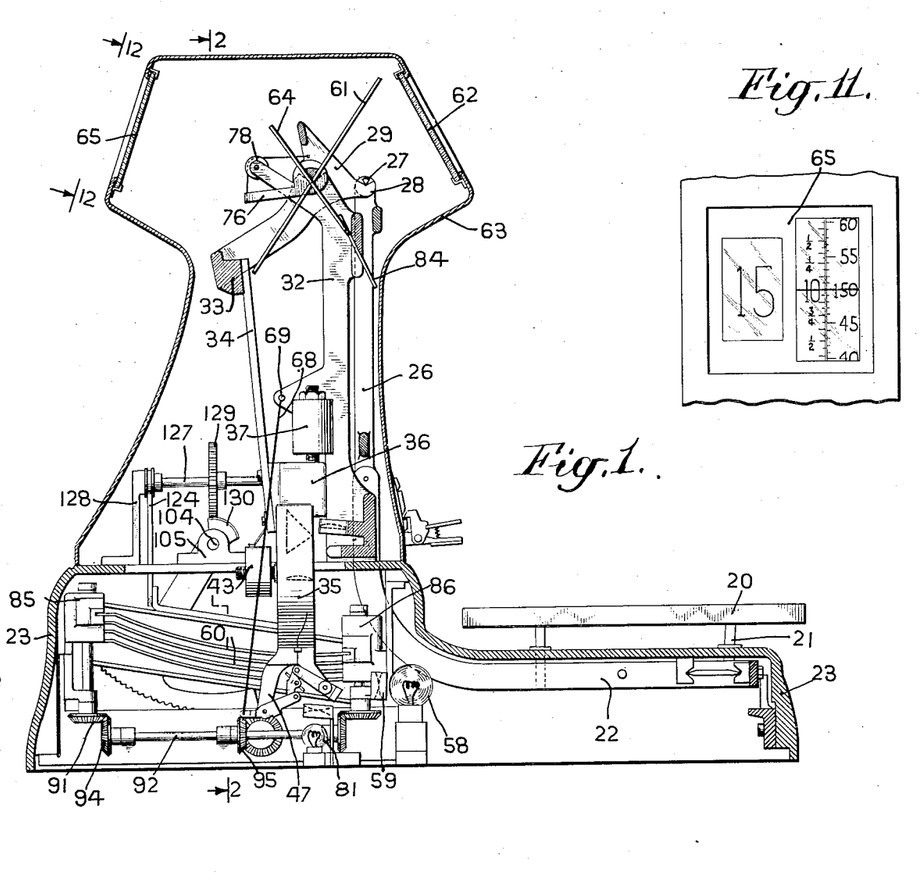
Fig. 1 is a side section through the scale.
Fig. 11 is a view of the screen on the customer's side of the scale showing as an example an image of chart graduations.
Figure 2:
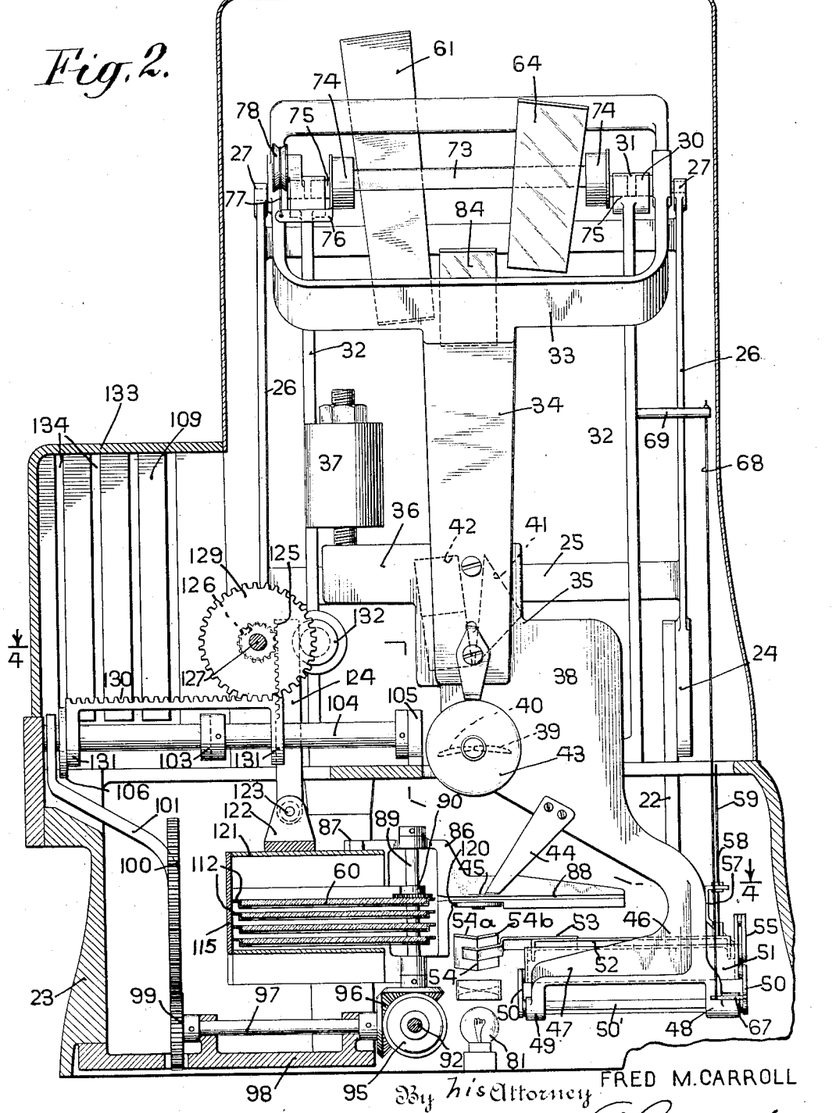
Fig. 2 is a section on line 2—2 of Fig. 1.

Referring to Figs. 1 and 2, the scale comprises a platform 20 upon which the object to be weighed is placed. The weight of the object displaces through rods 21 a curved link 22, the horizontal portion of which is disposed within the part of base 23 located beneath the platform. The vertical part of link 22 is pinned to a depending extension 24 of a rectangular framework 25, the vertical legs 26 of which have knife edge bearings 27 at their upper ends resting upon wedge shaped bearing recesses 28 formed in the sides 29 of a load offsetting mechanism or pendulum (Fig. 1). Spaced from the bearing recesses 28 the sides 29 have knife edges 30 (Fig. 2) projecting at right angles therefrom and journalled in bearings 31 formed at the upper end of standards 32 supported on the top of base 23. Integrally connecting the sides 29 of the pendulum is a cross piece 33 having a central depending extension 34. The lower end of said extension has bolted to it a framework 35 having a horizontal beam 36 carrying an adjusting weight 37. The framework proper consists of a vertically disposed housing 38 (Fig. 2) carrying double convex reversing lenses 39 and 40 and triangular prismatic lenses 41 and 42. The lenses 41 and 42 are disposed with the triangular faces of one at right angles to the triangular face of the other.

An adjusting nut 43 is rotatably mounted on a threaded bolt attached to one of the side plates of the housing 38 at right angles to previously mentioned adjusting nut 37. Bolted to the side of housing 38 is a support 44 carrying a hair line 45 (Fig. 2). The side plates of the housing merge into a solid curved leg 46 which terminates in a bifurcated structure 47 formed with two spaced bearing lugs 48 and 49. Links 50 connected by integral plate 50' are journalled in said lugs and pivoted to the sides of a housing 51 (Figs. 2, 4, 6 and 7). Intermediate its ends, the housing 51 has pivoted thereto a carrier 52 to the end of which is rigidly attached a bracket 53 carrying a reflector 54. A lever 55 is pivoted at one end to the upper part of one of the sides of housing 51 and is pivoted at its other end to a lower extension 56 of a plate 57 fixed to leg 46.

Figure 6:
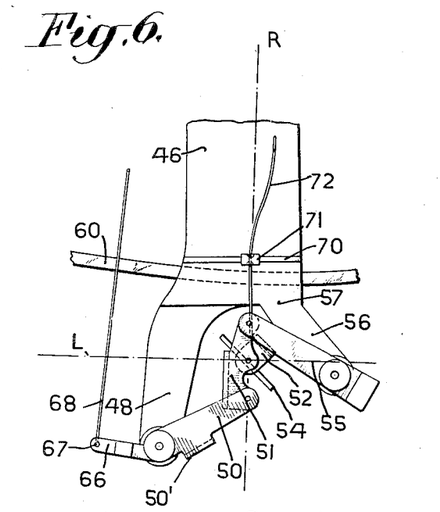
Fig. 6 is a detail view of the lower end of the pendulum showing the position of the parts when no weight is on the scale platform.

The reflector 54 comprises two mirrors 54a and 54b (Fig. 2) at an angle to each other. Both mirrors when the pendulum is in 0 position make an angle of approximately 45° to the horizontal. A stationary lamp 58 (Fig. 1) is mounted within the base 23. Adjacent the lamp is a condenser lens 59 which concentrates a horizontal beam of light L (Figs. 6 and 7) upon the mirrors 54. The mirrors reflect the beam L when the pendulum is at 0 position approximately in a vertical direction as shown in Fig. 6 where R designates the reflected beam. The direction of the reflected beam R must be such that the beam will always be cut by the weight indicating means which in this case is the hair line 45. It is understood that the pendulum is adjusted so that the hair line indicates 0 when there is no weight on the platform. Referring to Figs. 2 and 8, from mirror 54b, the reflected beam Rb passes through a stationary weight and rate chart 60 of transparent material at a point thereof which is covered by the hair line 45. This point of the chart bears the reading corresponding to the weight on the platform. The beam carrying an image of the reading then passes through lens 40, and prismatic lens 42, which casts the image upon a mirror 61. The latter projects the image upon a ground glass screen 62 (Figs. 1 and 8) mounted in the housing 63 at the side thereof which is in sight of the clerk.

Figure 9:
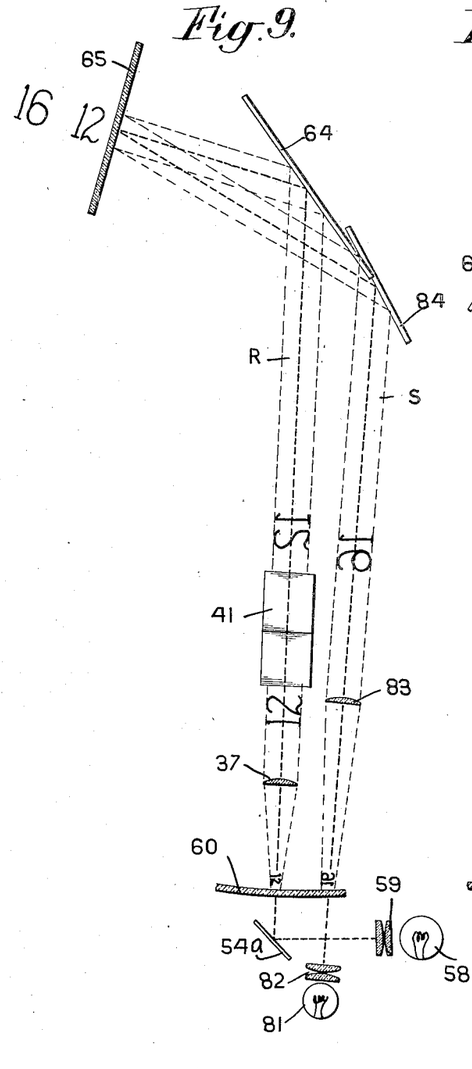
Fig. 9 is a diagrammatic view of the optical system for projecting a chart indication on the customer's side of the scale.

Referring to Figs. 2 and 9, from mirror 54a, the beam Rb is projected through the chart 60 at the point thereof, previously mentioned, which carries the reading indicated by the hair line 45. The image carrying beam then passes through lenses 39 and 41 and is cast upon a mirror 64 which reflects it to a ground glass screen 65 mounted in the side of the housing 63 opposite the side thereof in which screen 62 is mounted and which is in view of the customer. Reflected beams Ra and Rb intersect each other and the chart at the point of the chart which is beneath the hair line 45, so that both beams carry images of the same reading.

Figure 7:
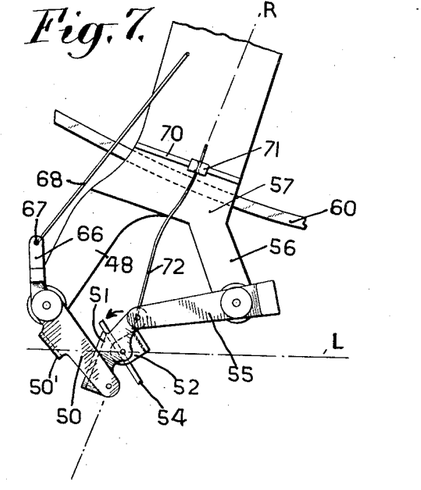
Fig. 7 is a view similar to Fig. 6 with the parts in a different position.
Figure 8:
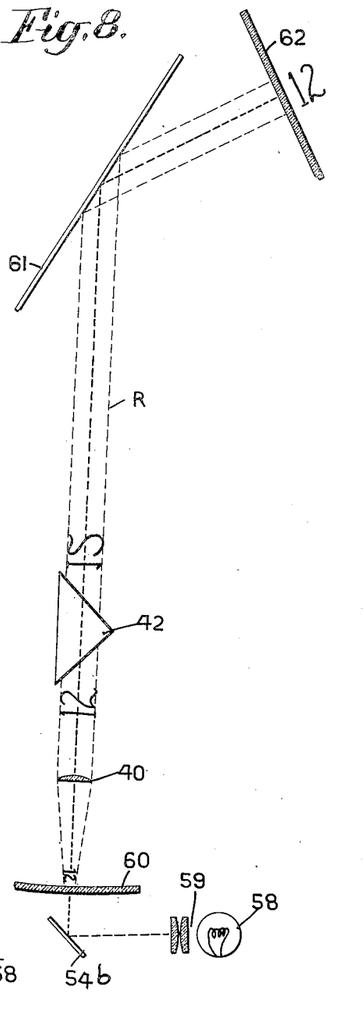
Fig. 8 is a diagrammatic view of the optical system for projecting a chart indication on the clerk's side of the scale.

When a weight is placed on platform 20, the pendulum swings from its zero position, shown in Fig. 6, to a position such as that shown in Fig. 7. Were mirrors 54 fixed relatively to the pendulum, they would move in an arc about knife edge pivots 30 and 31 and consequently take a position above the horizontal beam L directed from lamp 58. The mirrors would then fail to intercept the beam L and reflect it through the scale chart 60. Furthermore, the beam R reflected from the mirrors must change its angle relatively to beam L when moving from the position in Fig. 6 to Fig. 7 in order to take a direction covering the indicating hair line 45. To keep the mirrors in position for intercepting the beam L no matter what the position of the pendulum may be, means are provided to lower the mirror carrier 52 in proportion to the movement of the pendulum, said means including an extension 66 on the right hand link 50, as viewed in Figs. 2 and 4. A pin 67, fixed to the end of extension 66, has attached thereto a rigid wire rod 68, the other end of which is fixed to a stud 69 secured to the stationary frame plate 42. Referring to Figs. 6 and 7, as the pendulum structure swings on its pivot the pivotal connections of links 50 to pendulum end 47 move farther away from the stud 69. The rod 68 being fixed in length, the pin 67 on extension 66 of link 50 remains a fixed distance from stud 69. This results in pin 67 moving clockwise about the pivots of links 50 thus rotating said links in a clockwise direction thereby lowering the housing 51 and mirror carrier 52. By properly designing the linkage 50, 51 and 55, the mirror carrier 52 is lowered sufficiently and in proportion to the pendulum movement to intercept beam L in every position of the pendulum.

In order to keep the mirrors at the proper angle relative to beam L, plate 57 attached to pendulum leg 46 has a projecting portion 70 provided with a guide sleeve 71 having an opening therethrough in which a curved or preformed wire 72 is slidable. The lower end of the wire is rigidly attached to the mirror carrier 52 while its upper end is free. The wire is shaped to hold the mirror carrier and the mirrors mounted thereon at an angle relative to beam L such that the reflected beam R will cover the hair line 45 in every position of the pendulum. The proper shape of the wire, in practice may be determined by experimental observations, extreme accuracy not being necessary, although desirable, since the beam R covers an area of the chart 60 which is relatively large compared to the hair line 45. By reflecting the beam R to constantly cover the hair line, the beam will also be properly directed to pass through the lenses carried by the pendulum, the lenses having a fixed position relatively to the hair line.

Figure 5:
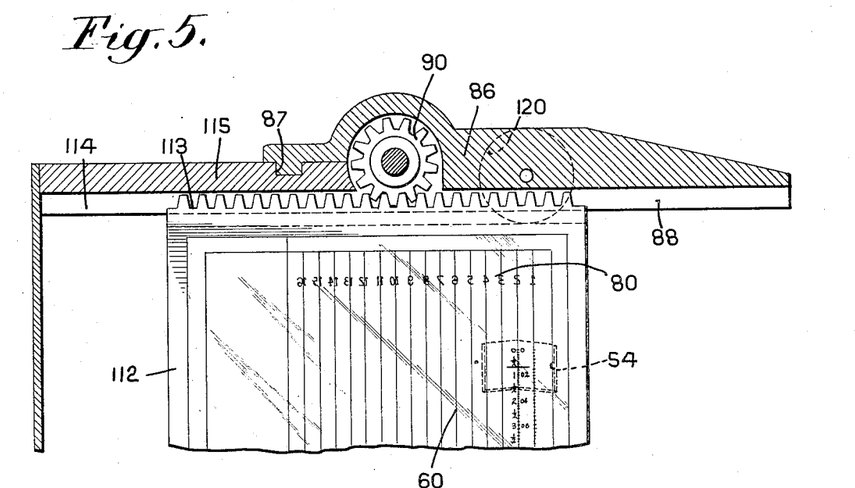
Fig. 5 is a detail of the means for adjusting the chart to the desired rate position.

The image reflected from the mirrors 61 and 64 onto the screens 62 and 65 should be preferably centrally located on the screens and should have the same location for all positions of the pendulum. Since the beam R moves with the pendulum relatively to the frame members 32 which support the mirrors 61 and 64, the angle of the beam relative to these mirrors will vary. Accordingly, the images will shift below their desired positions on the screens and may even fall outside the limits of the screens. In order to obviate this, the mirrors are given a movement proportional to the movement of the pendulum. As is well known, the angle through which the mirror must move in order that a beam striking it be reflected therefrom in the same direction regardless of the movement of the striking beam is one-half the angle through which the beam moves from one position to another. Thus, if the beam moves 30° relative to the plane of the mirror, the latter must move 15° in the same direction in order that the reflection of the beam from the mirror remain fixed in the same direction as before. In order to move the mirrors 61 and 64, they are mounted on a rod 73 provided with circular discs 74 at their ends from which knife edges 75 project. The knife edges are journalled in the bearings 31 of frame 32 which also act as the bearings for the knife edges 30 of the pendulum as previously described. The shafts 75 and 30 therefore have a common center of oscillation. The left hand disc 74, as viewed in Fig. 2, is formed with a projecting arm 76 to the end of which is fastened a cord or wire 77 which passes over a pulley 78, fixed to the frame 32 and is attached at its other end to one of the pendulum sides 29, (Fig. 1). The point of attachment of wire 77 to arm 76 is made twice the distance from the center of rotation as the point of attachment of the wire to the pendulum side 29. The movement of the pendulum obviously results in the point of attachments of the wire to side 29 and arm 76 moving through the same distance. It is known that the angular distance through which two radii move is proportional inversely as their lengths and directly as the lengths of their arcs. Since the lengths of the arcs covered by the points of attachment are equal, the angle subtended by said arcs is proportional inversely to the distance of the attachment points from the center. The point of attachment of the wire to arm 76 being twice as far from the center as the point of attachment of the wire to the pendulum the arm 76 will move through half the angle that the pendulum moves through. Shaft 73 rigid with arm 76 and the mirrors carried thereby rotate through the same angle as arm 76. As the beam R, which maintains the same relative position to the pendulum at all times by the means previously described, moves with the pendulum, the mirrors on shaft 73 will thus move one-half the angular distance through which the beam moves. The reflection of the beam from the mirrors will therefore be in the same direction at all times regardless of the position of the pendulum and the images will not shift on the screens with movement of the pendulum. Together with the rate and weight reading, it is desirable to show the customer the image of the price rate of the article. The scale chart 60, as shown in Fig. 5, has a plurality of different rates 80 inscribed thereon. When a chart, by means hereinafter described, is adjusted to position a selected rate scale for reading by the optical system described, the rate indication 80 of the selected scale is directly in line with a beam S projected from stationary lamp 81 (Figs. 1, 2 and 9) through condenser lens 82. The image of the rate indication is cast upon a mirror 84 fixed to the frame 32 and mirror 84 casts the rate image upon screen 65. The position of the rate image relative to the scale reading is shown in Fig. 11.

Referring to Figs. 5, 8, 9 and 11, the manner in which the lenses cast an upright image on the screens will be understood. Lenses 39, 40 and 83 reverse the image completely. Lenses 41 and 42 reverse the image only in the direction of its length and the image is reflected from the mirrors 62 and 64 with the figures upright and in the proper relation as shown in Fig. 11. The charts 60 are curved in conformity to the arc of movement of the pendulum in such a manner that the hair line 45 is always at the same distance from the surface of the chart.

Figs. 1 to 5 illustrate the means for selecting a rate scale on a chart for cooperation with the reading means previously described. The base 23 is provided wih a pair of brackets 85 and 86, each having vertical guide ribs 87 (Figs 2 and 4) and horizontal guide slots 88. A pair of shafts 89, each carrying a pair of gears 90 and bevel gears 91 are journalled in the brackets (see Fig. 3). At right angles to the shafts 89, a shaft 92 is journalled in a frame member 98 rigidly attached to the base 23. The shaft 92 is provided with bevel gears 94 at its ends meshing with gears 91 and intermediate its ends has a bevel gear 95 meshing with a bevel gear 96 on the end of a shaft 97 journalled at right angles to shaft 92 in an extension of the frame 98 rigidly attached to base 23 (Fig. 2). The opposite end of shaft 97 has a gear 99 rotated by a segmental gear 100 formed on the end of an arm 101. A rod 102 (see Fig. 4) is fixed at one end to the free end of arm 101 at right angles thereto and has attached to its opposite end an arm 103 fixed to a shaft 104. Arms 101 and 103 rotate with shaft 104 which is freely journalled at its ends in standards 105 mounted on the base 23. A lever 106 is journalled at one end on shaft 104 and intermediate its ends has an opening receiving rod 102. The free end of the lever has a pawl 107 pivoted thereon and urged into engagement with notches 108 in a selected one of a plurality of arcuate racks 109 by means of a spring 110 (Figs. 3 and 10) positioned between the end of the lever and a plate 111 fixed to the pawl. By grasping the plate 111 and the end of the lever, the pawl 107 may be disengaged from the rack 109 and the lever oscillated on shaft 104. As the lever swings, it carries rod 102 with it which in turn causes arm 101 and the rack 100 on its end to oscillate about the center of shaft 104. Rack 100 drives shaft 97 through gear 99 and shaft 97 in turn drives shaft 92 through meshing gears 95 and 96. Upon rotation of shaft 92, gears 94 rotate shafts 89 through gears 91.

Each chart 60 is carried by an open rectangular frame 112, (see Figs. 4 and 5), a pair of opposite sides of which have racks 113 adapted to mesh with gears 90 on shafts 89. The racks are slidably guided in slots 114 formed in the sides of a pair of members 115, having vertical guide slots fitting the vertical guide ribs 87 on bracket members 85 and 86.

Referring to Fig. 5, it may be seen that the list of rates 80 is located on the scale chart on a line parallel to the racks 113. At right angles to the line of price rates and in alignment with each rate figure is a graduated scale of weights and corresponding totals equal to the product of the rate and the weights. Each chart has, in this instance, sixteen different rates and corresponding graduated rate and weight scales. The pendulum reading means is adapted to oscillate along one of the graduated rate and weight scales, as seen from Figs. 4 and 5. Corresponding to each rate on the chart is one of said notches 108. The notches are marked alongside with their corresponding rates. When a particular rate is desired, the pawl 107 is released from the notch it is then engaging and the lever 106 swung to a position where pawl 107 may engage the notch which is marked with the rate desired. In this movement, the rack 100 actuated by lever 106, effects rotation of shafts 89, as above described, which through gears 90 and racks 113 move the chart 60 an amount proportional to the movement of lever 106. Thus, if pawl 107 engages the notch 108 marked 2 (see Fig. 10), the chart will have been moved to a position where the rate and weight line marked 2 will overlie the mirrors 54 as shown in Fig. 5. The brackets 85 and 86 have rollers 120 which bear against the sides of chart holders 112 immediately below the rack teeth and in addition to reducing friction assist in holding the chart so that the desired rate scale when in reading position lies at right angles to the hair line 45 of the pendulum.

Figures 3, 10:
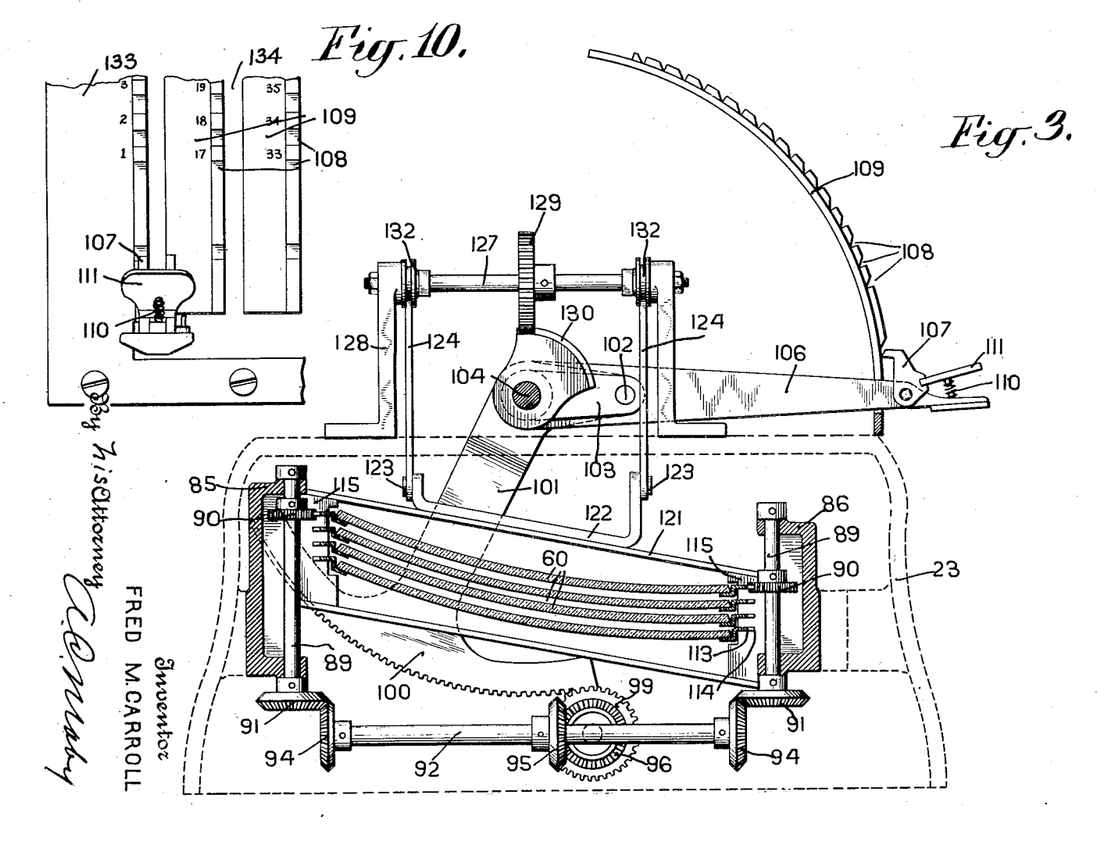
Fig. 3 is a detail view of the chart assembly showing the mechanism for adjustably positioning the charts.
Fig. 10 is a front detail view of the notched portion of the housing which cooperates with the adjusting lever for the charts.
Figure 4:
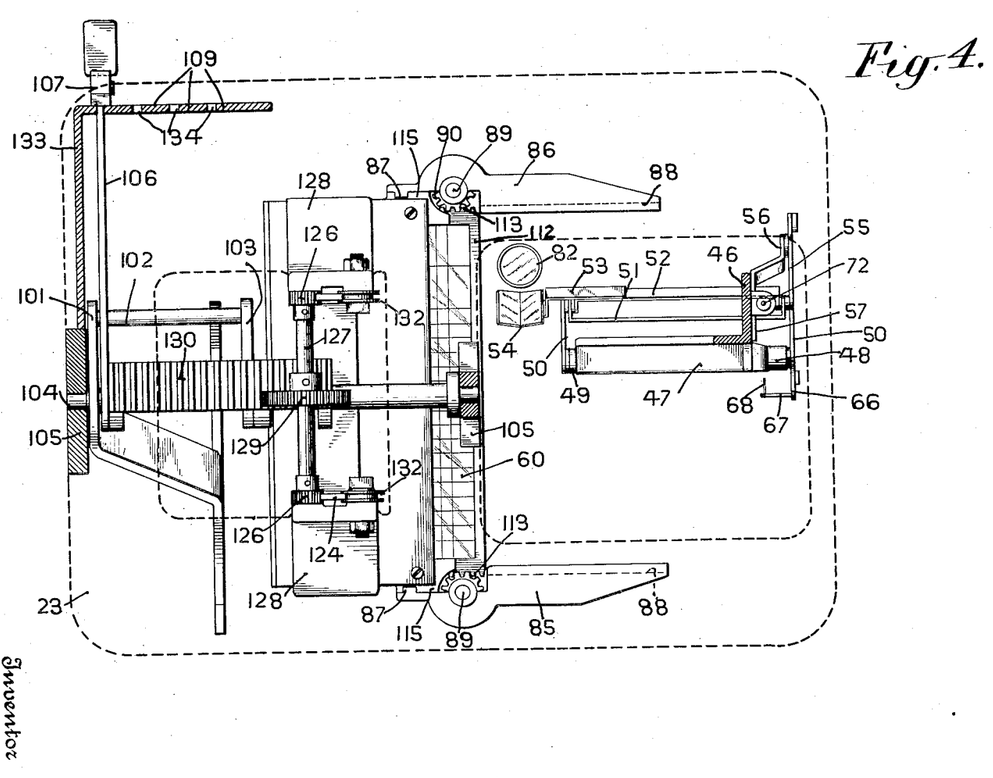
Fig. 4 is a section on line 4—4 of Fig. 2.

To provide a large range of rates, a plurality of scale charts 60 are used, each having sixteen different rates. The chart shown in Fig. 5 has rates 1 to 16. The chart below has rates 17 to 32, still another has rates 33 to 48, and so on. While only four charts are shown, each having sixteen rates, it is obvious that more or less than four charts having any convenient number of rates may be employed. As stated, the charts are mounted in holding frames 112 slidably carried by members 115. When any particular chart is desired for cooperation with the optical reading system, the holder 112 of the selected chart is first moved to position where its racks 113 are in mesh with gears 90 which upon rotation then move the chart to various rate positions. The movement of the holder 112 to meshing position with gears 90 is effected by moving the members 115 in which all the holders 112 are carried in a vertical direction relative to brackets 85 and 86, being guided in this movement by ribs 87 of the brackets. Referring to Figs. 2 and 3, the tops of members 115 have attached thereto a plate 121 on which is mounted a bracket 122, provided with a pair of vertical legs having aligned bearing or journal pins 123. Rotatably mounted on these pins are a pair of links 124, the upper portions of which have on one edge a series of rack teeth 125 adapted to cooperate with a pinion gear 126 fixed to a shaft 127 journalled in standards 128 mounted on the base. Intermediate the ends, shaft 127 has fixed to it a gear 129 which meshes with rack teeth 130 slidably mounted by means of a pair of sleeves 131 on the shaft 104. One side of the left sleeve 131 is rigidly attached to the shaft receiving portion of lever 106 which is freely slidable on the shaft and the rod 102 parallel to the shaft. The movement of lever 106 along the shaft and rod carries with it the rack 130 which thereupon actuates gear 129 to effect rotation of shaft 127. Gears 126 on the latter shaft thereupon actuate links 124 through rack teeth 125, the links being limited to vertical movement by a pair of guiding rollers 132. Upon movement of links 124, the members 115 to which they are attached by plate 123 also move in a vertical direction carrying the chart holders 112 with them. In Fig. 2, the upper chart holder is shown in position for coaction with rate adjusting gears 90. By sliding rack 130 the proper distance along shaft 104, any one of the other charts may be brought into cooperation with gears 90. The amount of movement of rack 130 along shaft 104 required to bring a chart into position for coaction with gears 90 is determined by a series of slots 134, each corresponding to a chart, cut in the housing extension 133 (Figs. 2, 3 and 10). Alongside each slot is one of the aforementioned racks 109 having the notches 108. When a particular chart is to be selected for reading, the pawl 107 on lever 106 is released from the notch 108 it may be then engaging and the lever lowered below the racks 109. This causes the chart which had been in reading position with a portion extending into slot 88 (see Fig. 2) to move to its inactive position out of slot 88 so it will not interfere with vertical movement of holders 115. The lever 106 is then moved along shaft 104 till it is below the slot 134 corresponding to the selected chart. In this movement of the lever, the rack 130 will have effected the required vertical movement of members 115 to bring the desired chart into coaction with gears 90 and in line with guide slot 88. In order to then select the required rate on the selected chart, the lever is moved upwards along the slot 134 till it reaches the notch 108 in the rack 109 to the left of the slot which is marked with the desired rate, as shown in Fig. 10. This movement of the lever along the slot rotates rate-adjusting gears 90 through arcuate gear 100 as previously explained. When the lever is opposite the proper notch 108, pawl 107 is released to engage the notch and hold the lever in adjusted position.

It will be understood that lamps 58 and 81 are furnished with current in any convenient manner, the current being turned off when the scale is not in use. The lamps may also be of a type adapted to burn kerosene or the like fuel.

Figure 12:
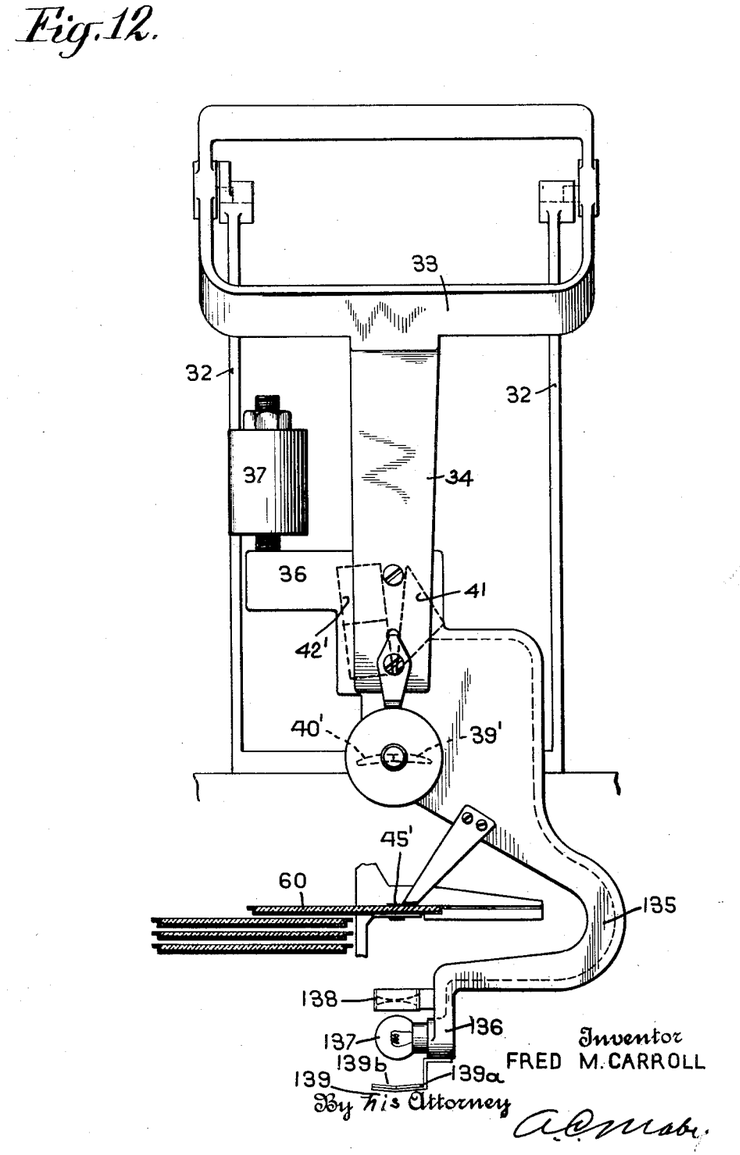
Fig. 12 is a detail view of a modification of the scale shown in the other figures.

In Fig. 12, a modification of the lower portion of the pendulum is shown. In this modification the pendulum terminates in a curved leg 135 having a depending portion 136 which carries a lamp 137 a condenser lens 138 above it and below the lamp a reflector 139 comprising mirrors 139a and 139b. The rest of the apparatus is identical with that previously described in the first modification. In operation, mirror 139a reflects a beam from lamp 137 through lenses 138, 40' and 42' to convey the image of the reading on the chart 60 indicated by hair line 45' to the mirror and screen (not shown here). Likewise, reflector 139b directs a beam from lamp 137 through lenses 138, 39' and 41 to convey the image of the reading indicated by hair line 45' to the other mirror and screen (not shown here). The advantage of this modification is its simplicity obtained by the relatively fixed lamp and reflector system, thus avoiding the provision of means to move the reflectors relatively to the pendulum in proportion to the movement of the latter.

The operation of the scale will be understood from the previous description. To summarize, when weighing an article, the operator knowing the rate at which the article is to be sold, moves the lever 106 to the notch 108 which is marked with said rate. This will automatically position the chart and the proper rate on the chart for cooperation with the reading system. For example, if rate 34 is to be used, the pawl 107 is engaged in notch 34 (see Fig. 10) which brings the rate scale 34 on the third chart from the top (as seen in Fig. 2) into cooperation with the reading system. The current is then turned on to light the lamps and the article placed on the platform. The pendulum will then be displaced a distance proportional to the weight of the article. Mirror 54b, lenses 40, 42 and mirror 61 will then project a magnified image of the total cost and weight of the article upon screen 62 in view of the clerk. Mirror 54a, lenses 39 and 41 and mirror 64 will project the same image on screen 65 in view of the customer. At the same time, lenses 82, 83 and mirror 84 will project the price per pound indication on the customer's screen.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims:

What is claimed is:

1. In a weighing scale, in combination, a chart, means movable along the chart in response to the load, a projector connected to said movable means for reading said chart, and a device on which the chart reading is projected.

2. In a weighing scale, in combination, movable weighing means, indicating mechanism including a graduated chart and a plurality of screens, and a projecting mechanism connected to said weighing means for projecting indications on said chart upon both of said screens in accordance with the movement of said weighing means.

3. In a weighing scale, in combination, weighing mechanism, a transparent chart, a plurality of screens, and means for projecting the same portion of said chart upon each of said screens, said means and said chart being moved relatively by said weighing mechanism to select different chart portions for projection.

4. In a weighing scale, in combination, weighing mechanism, a transparent chart associated therewith, a projector connected to said weighing mechanism, a source of light for casting a beam of light on the projector, the latter re-directing the beam of light through the chart, and means for shifting said projector relative to said source of light in accordance with the position of said weighing mechanism to maintain the re-directed beam of light in the same direction relative to the weighing mechanism in all positions of the latter.

5. In a weighing scale, in combination, movable weighing mechanism, a screen, a chart having a plurality of value rows, a rate indication on said chart in line with each value row, a projector for projecting on said screen a value indication contained in one of said rows, said chart and said projector being moved relatively by said weighing mechanism, and means for projecting on said screen the rate upon which the indication projected on said screen is based.

6. In a weighing scale, in combination, a support for an object, a chart having a plurality of rate rows, each row having a basic value designation and total value designations calculated on said basic value in correspondence to different weights, and means for projecting the basic value designation of one of said rate rows simultaneously with the total value designation in said rate row which corresponds to the weight of an object on said support.

7. In a weighing scale, in combination, weighing mechanism, a plurality of screens, a chart associated therewith, and means connected to the weighing mechanism for projecting a magnified image of the same portion of said chart on each of said screens.

8. In a weighing scale, in combination, weighing mechanism, a chart associated therewith, said chart having a plurality of value rows, a projector, and means independent of said mechanism for shifting said chart to permit said projector to project the characters of a selected value row.

9. In a weighing scale, in combination, a chart, a projector for projecting characters of said chart, weighing mechanism associated with said chart and projector for selecting said characters for projection, and a source of light movable relative to said projector and adapted to furnish said projector with a projecting beam.

10. In a weighing mechanism, in combination, a support for an object, a chart having a plurality of rate rows, a projector movable in response to the weight of an object on said support and serving to project an indication contained in one of said rate rows, and manual means for shifting said chart to position a selected row thereof for cooperation with said projector.

11. In a weighing device, in combination, a transparent chart, a projector adapted to project a plurality of intersecting projecting beams through an indication on said chart, and weighing mechanism for moving said chart and projector relatively.

12. A device comprising weighing mechanism, a transparent chart associated therewith, a plurality of screens, and means for simultaneously projecting the same portion of said chart upon each of said screens.

13. In a weighing scale, a chart bearing value indications and corresponding rate indications, a reading line, weighing mechanism for moving said chart and line relatively to cause said reading line to coact with a value indication, a screen, means for projecting the latter value indication on said screen, and means adapted to coact with one rate indication at a time for simultaneously projecting only the rate indication corresponding to the latter value indication on said screen.

14. In a weighing scale, a chart bearing rows of value indications and a unit price indication alined with each row of value indications, a reading line, manual means for selecting one of said rows of value indications for cooperation with said reading line in accordance with the unit price of an article to be weighed, a screen, means for projecting the unit price of the selected row on said screen, article weighing mechanism for moving said selected row and said reading line relatively whereby said line coacts with a value indication in accordance with the weight of an article, and means for projecting the latter value indication on said screen in juxtaposition to the projected rate indication.

15. In a scale, a screen, a chart having rows of characters, a projecting device for projecting characters of said chart on said screen, means for moving said device and chart relatively to select the characters of one of said rows for projection, weighing mechanism for moving said device and chart relatively to effect projection of a portion of said selected row in accordance with the weighing operation, and means for moving said device and said screen relatively for keeping the location of the projection on said screen constant.

16. In a weighing scale, a chart bearing different indications, a screen, projecting means for projecting said indications on said screen, and weighing mechanism for moving said means and chart relatively to select the indications for projection, said mechanism serving upon a weighing operation to shift said screen and means relatively to keep the location of the projection on the screen constant.

17. In a weighing scale, in combination, a transparent chart bearing different indications, a projecting device for projecting said indications, a stationary housing enclosing said chart and device, a plurality of screens stationarily carried by said housing, and weighing mechanism for moving said device and chart relatively to select indications for simultaneous projection on said screens.

18. In a weighing scale, in combination, a chart bearing a row of graduations, a projecting device cooperating with said chart, weighing mechanism for moving the chart and projecting device relatively in the direction of a chart row, the projecting device including a plurality of projecting elements offset from each other in a direction lateral of said row, and a plurality of similarly offset screens upon which said elements project said graduations.

19. In a scale, such as defined in claim 8, said means being manually operative.

20. In a scale such as defined in claim 8, said means being manually operative, and an indicator for indicating the row selected by said means.

21. In a scale such as defined in claim 8, said means being manually operative, and a device for releasably latching said means in selected position.

22. In a weighing scale, in combination, a chart, means for directing a plurality of intersecting beams on said chart with the intersection of said beams being substantially on the surface of said chart, means for intercepting the beams after they have been acted on by the chart and weighing mechanism for moving said chart and projecting means relatively.

23. In a weighing scale such as described in claim 11, the intersection of said beams being substantially on the surface of said chart.

24. In a weighing scale such as described in claim 11, and a plurality of screens, each corresponding to one of said beams and adapted to receive only the projection of the chart obtained by the corresponding beam.

25. In a scale such as described in claim 22, and a plurality of screens, each corresponding to one of the beams and on which the intercepting means projects only the image of the chart obtained by the corresponding beam.

26. In a weighing scale, a stationary housing, a transparent graduated chart within said housing, a plurality of stationary screens carried by said housing and visible from the exterior thereof, a projector within said housing for projecting chart graduations upon each of said screens, weighing mechanism for moving said projector and chart relatively in one direction, and means for moving said chart and projector relatively in a different direction to select graduations for projection.

27. A device comprising a transparent chart, weighing mechanism movable relatively thereto, and means connected to the weighing mechanism for projecting a ray of light through the chart.

28. In combination, a transparent chart, weighing mechanism, a source of light, and means connected to the weighing mechanism for directing the rays of light from the source through the chart.

29. The combination such as defined in claim 28, and means on the side of the chart opposite the light directing means for intercepting the rays of light after they have been acted on by the chart.

30. In combination, a chart and an optical device for reading the chart including surfaces at an angle to each other for directing light in different directions on said chart.

31. A device comprising a chart, means movable along the chart in response to a load, a projector connected to said movable means and located to one side of the chart for sending a beam of light through said chart for reading the chart, and a device at the side of the chart opposite the projector for intercepting the chart reading beam.

32. In combination, a chart bearing a series or graduations, a housing for enclosing said chart, a plurality of screens stationarily mounted in said housing, and means for casting an image of the same area of said chart on each of said screens.

33. In combination, an image displaying device, a load support, weighing mechanism connected to the support, an effectively transparent chart, a pair of optical elements one on each side of said chart and in alinement connected to said weighing mechanism, and a light source cooperating with said optical elements for projecting an enlarged image of the chart on said image displaying device.

34. In combination, a stationary housing having a plurality of different openings, a plurality of spaced screens each stationarily mounted in a different one of said openings, a chart located inside the housing, and means movable relative to the chart and screens for projecting an image of the same portion of said chart upon each screen.

In testimony whereof I hereto affix my signature.

FRED M. CARROLL.